United States Patent [19]

Okabe

[11] Patent Number: 4,807,276

[45] Date of Patent: Feb. 21, 1989

[54] RE-TRANSMISSION METHOD AND APPARATUS IN COMMUNICATION SYSTEM USING PUBLIC COMMUNICATION LINES

[75] Inventor: Shinichi Okabe, Hitachi, Japan

[73] Assignee: Hitachi, Ltd., Tokyo, Japan

[21] Appl. No.: 147,325

[22] Filed: Jan. 22, 1988

[30] Foreign Application Priority Data

Jan. 24, 1987 [JP] Japan .................................. 62-14472

[51] Int. Cl.$^4$ ........................ H04M 11/00; H04N 1/32
[52] U.S. Cl. .................................... 379/93; 379/100; 178/1; 178/2 R
[58] Field of Search ................. 379/93, 100; 358/280, 358/305; 178/1, 2 R, 3, 4, 4.1 B

[56] References Cited

U.S. PATENT DOCUMENTS

| | | | |
|---|---|---|---|
| 4,471,489 | 9/1984 | Konetski et al. | 379/93 |
| 4,595,951 | 6/1986 | Filliman | 358/147 |
| 4,710,951 | 12/1987 | Hezono | 379/100 |

FOREIGN PATENT DOCUMENTS 62257561 7/1985 Japan .

Primary Examiner—Stafford D. Schreyer
Attorney, Agent, or Firm—Antonelli, Terry & Wands

[57] ABSTRACT

In a communication system having an automatic transmission/reception function to perform data communications through telephone lines associated with teletex systems, facsimile systems and the like, re-transmission operations are performed when an addressee called for communications is busy (calling) or when communications is interrupted after an addressee has responded. In the re-transmission operation, a response from an addressee is detected and decided as to whether the response is automatically originated from a communication unit or originated by a person. When the latter response is detected, a wrong telephoning is decided and restrictions are placed on the re-transmission operation to thereby minimize trouble given to the addressee. On the condition that a wrong telephoning and a communication failure transmission operation are decided, the addressor station sequentially reduces the calling time or response waiting time in the communication system for each of re-transmission operations following the communication failure transmission operation, and on the condition that a response is received but no negotiation is settled within a predetermined period of time whereby a wrong telephoning and a communication failure transmission operation are decided, the addressor station inhibits communication operations following the communication failure transmission operation when time runs within a midnight discount time zone and permits the communication operations, inclusive of the initial transmission operation, to be performed twice when time runs outside the midnight discount time zone.

13 Claims, 7 Drawing Sheets

F.I.G. 2

RE-TRANSMISSION METHOD AND APPARATUS IN COMMUNICATION SYSTEM USING PUBLIC COMMUNICATION LINES

BACKGROUND OF THE INVENTION

This invention relates to a communication system such as a teletex system in which transmission and reception of documents are effected between word processors through public communication lines and more particularly to method and apparatus for re-transmission operations to be performed in the event of a wrong telephoning.

In a communication system having an automatic transmission/reception function to perform data communications through telephone lines, a re-transmission operation is performed a predetermined period of time after an addressee called for communications is determined busy (calling) or when communications is interrupted after an addressee has responded. Depending on situations, the re-transmission operation is repeated several times. The communication interruption requiring a re-transmission is due to abnormality of an addressee station, connection transfer to the telephone set side preset by means of a communication unit/telephone set switching device in the addressee station, or a wrong telephoning caused when an operator on an addresser side inadvertently sets a wrong addressee telephone number. Of the above causes, the wrong telephoning is seriously troublesome.

Essentially, the communication system having the automatic transmission/reception function is unattended to run throughout 24 hours. Unless urgent, the time for transmission of documents is designated to advantage of economy such that the documents are transmitted within a midnight discount time zone. Accordingly, even when a wrong telephone number has been set by the operator, the communication unit calls an addressee of the wrong telephone number when the designated time is up. Naturally, the wrong telephoning forces a person or an attendant to respond and gives the attendant serious trouble. In addition, responding by the attendant leads to communication abnormality and the addressor tries to call again at the termination of a predetermined period of time in order to re-transmit a document to the same addressee.

Thus, the frequently repeated midnight wrong telephoning gives the addressee socially problematic, serious trouble.

Conventionally, as disclosed in JP-A-No. 60-223375, an approach to the above problems has been proposed wherein when a predetermined transmission procedure is not completed within a predetermined period of time following circuit connection, a wrong telephoning is assumed and a flag to this effect is set even if an addressee attendant responds and thereafter when a transmission (re-transmission) to the same addressee is again performed and similarly decided to be a wrong telephoning, the third and ensuing transmissions (re-transmissions) are inhibited. With this proposal, however, the wrong telephoning assumed in the first communication operation always connects to the second calling to the same addressee even when time runs, at the time of execution of the first communication operation, within the midnight discount time zone and so the wrong telephoning is conclusive, thereby unreasonably maximizing trouble given to the addressee.

SUMMARY OF THE INVENTION

An object of this invention is to provide a method and apparatus for re-transmission in a communication system having an automatic transmission/reception function to perform data communications through telephone lines associated with a teletex system and the like, wherein when a wrong telephoning occurs on account of, for example, setting of a wrong addressee telephone number, trouble given to the addressee can be minimized.

Another object of this invention is to provide a re-transmission method and apparatus wherein when a wrong addressee telephone number is inadvertently called in either of the abbreviated dialing mode in which addressee dial numbers frequently used in daily services and so precedently registered are used and the arbitrary dialing mode in which an addressee dialing number is inputted for communication with each desired addressee, restrictions are placed on the re-transmission operation due to the wrong telephoning in accordance with time which runs at the time of start of the communication operation to thereby minimize trouble given to the addressee.

To accomplish the above objects, according to the present invention, when a wrong addressee telephone number is inadvertently called, a wrong telephoning is detected in the course of the initial communication operation so as to put restrictions on the re-transmission operation in accordance with the dialing modes and time which runs at the time of the communication operation. According to the protocol on teletex communications (CCITT), negotiation on modem functions must be settled immediately after an addressee response to a call in order to determine a communication speed (bits per second) and a modem training signal. During the negotiation, the addressor should await a response from the addressee for 30 to 40 seconds at the maximum and the addressee should repeat returning of responses six times at the maximum at intervals of 3 seconds. Accordingly, in the event that the negotiation is not settled normally within the above period of time following the addressee response, a wrong telephoning is also decided and restrictions are placed on the re-transmission operation.

According to another feature of the invention, in re-transmission operations which are performed in a communication system such as a teletex system having an automatic transmission/reception function when an addressee called for communication is busy (calling) or when a communication is interrupted after an addressee has responded, a response from an addressee is detected and decided as to whether the response is automatically originated from a communication unit or originated by a person and when the latter response is detected, a wrong telephoning is decided and restrictions are placed on the re-transmission operation.

DESCRIPTION OF THE PREFERRED EMBODIMENT

The present invention will now be described by way of example with reference to the accompanying drawings.

Figure 1:
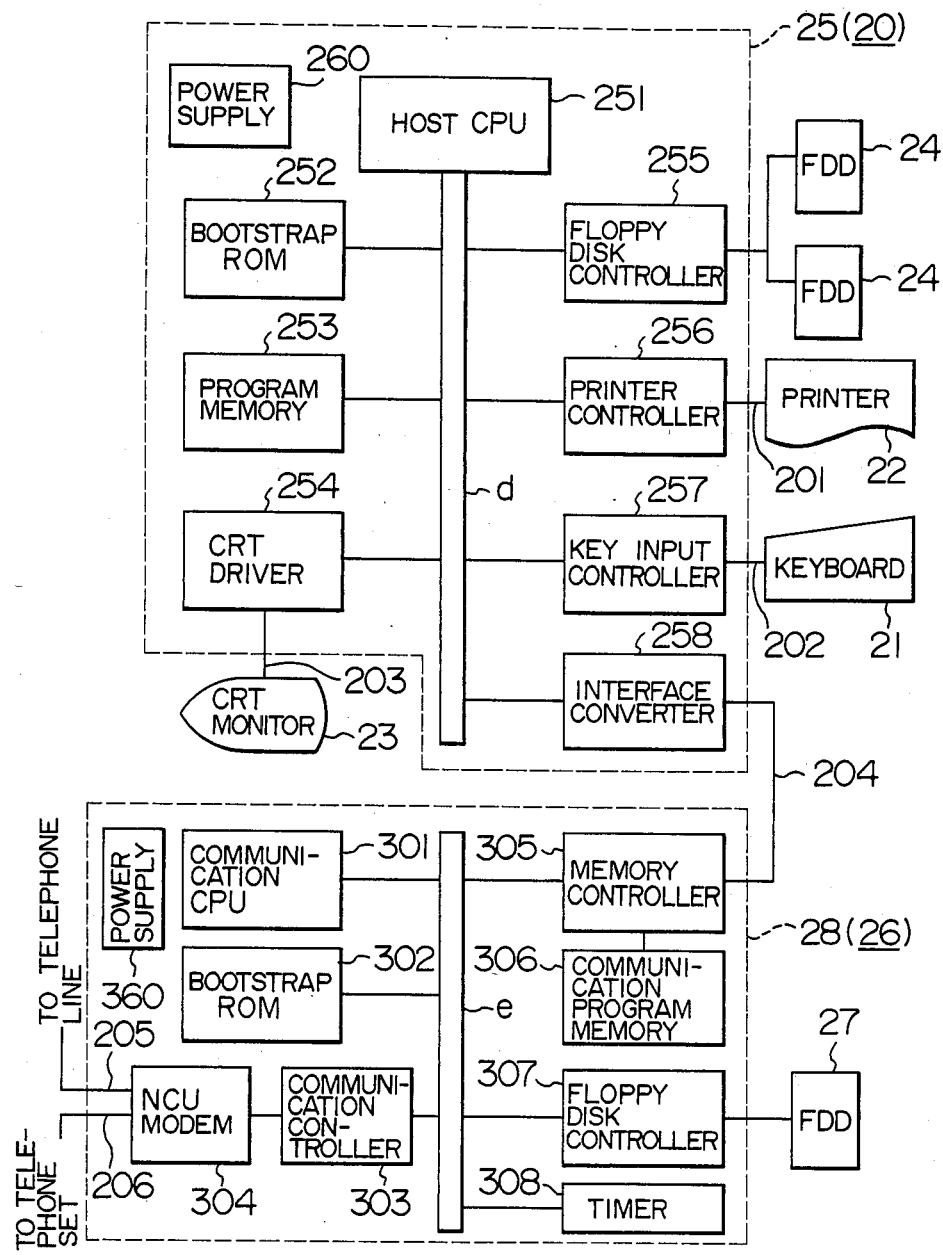
FIG. 1 is a block diagram illustrating the overall construction of a teletex system according to an embodiment of the invention.
Figure 2:
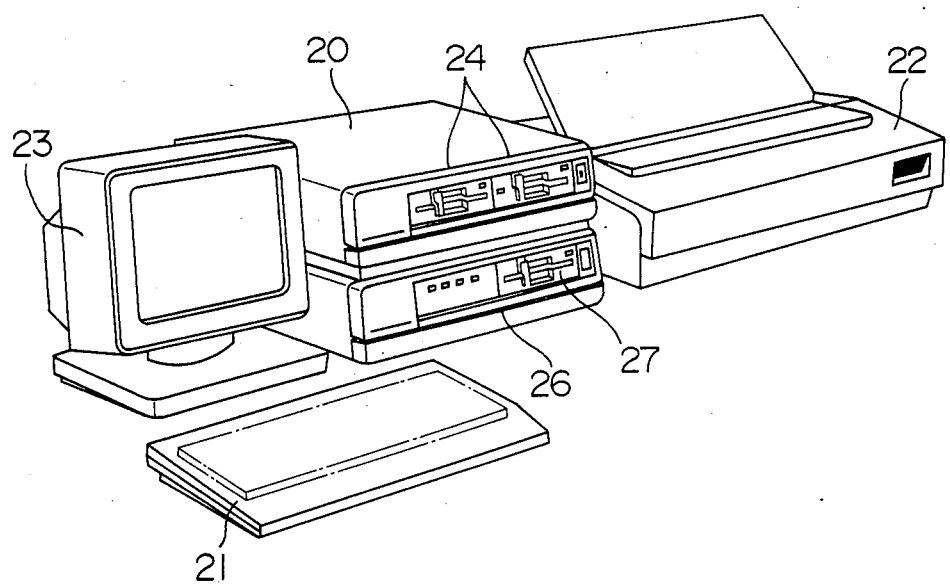
FIG. 2 is a perspective view showing the teletex system.

Firstly, reference should be made to FIG. 2 illustrating, in perspective view form, a teletex system according to a preferred embodiment of the invention. The teletex system comprises a word processor including a main console 20 having temporary storages and controllers, a keyboard 21 serving as an input unit, a printer 22 serving as a printing unit and a cathode ray tube (CRT) monitor 23 serving as a display unit, and a communication unit 26 having controllers and a temporary storage which are adapted for communication function As shown in FIG. 1, the main console 20 is interconnected with the printer 22 and keyboard 21 through cables 201 and 202, with the CRT monitor 23 through a cable 203 and with the communication unit 26 through a cable 204, in order to transmit and receive control signals and information signals.

In FIG. 2, denoted by reference numerals 24 and 27 are floppy disc devices which will simply be referred to as FDD's hereinafter.

The control circuit within the main console 20 is indicated by a broken-line block which is designated at 25 in a block diagram of FIG. 1.

More specifically, the main console control circuit comprises a host central processing unit (CPU) 251, a bootstrap read only memory (ROM) 252 comprised of a non-volatile memory and having a program to be executed upon turn-on of power supply, a program random access memory (RAM) 253 for storage of programs and information necessary for execution of functions of the word processor, a CRT driver 254 responsive to commands from the CPU 251 to generate screen display patterns and send video signals to the CRT monitor 23, a floppy disc controller 255 responsive to commands from the CPU 251 to control the FDD's 24, a printer controller 256 responsive to commands from the CPU 251 to send to the printer 22 signals for controlling the printer 22 and printing signals and to receive from the printer 22 a signal indicative of a status of the printer 22 so as to send the status signal to the CPU 251, a key input controller 257 responsive to commands from the CPU 251 to control the keyboard 21 and send to the CPU 251 input signals keyed in by the keyboard 21, an interface converter 258 for transmission/reception of data between the communication unit 26 and the main console control circuit 25, and an internal bus and line d through which the CPU 251 is interconnected with the bootstrap ROM 252, program memory 253, CRT driver 254, floppy disc controller 255, printer controller 256, key input controller 257 and interface converter 258. All the components of the control circuit as well as the FDD's 24, CRT monitor 23 and keyboard 21 are fed with DC voltage from a power supply 260.

The communication control circuit within the communication unit 26 is indicated by a broken-line block which is designated at 28 in the block diagram of FIG. 1.

More specifically, the communication control circuit 28 comprises a communication CPU 301, a bootstrap ROM 302 having a program to be executed upon turn-on of power supply, a communication memory 306 comprised of a RAM for storage of program and information necessary for execution of functions of communication through the medium of a telephone line 205, a memory controller 305 for controlling the communication program memory 306, a timer 308 for supervising data and time, a communication controller 303 responsive to commands from the CPU 301 to control data conversion and circuits for communications through the medium of the telephone line 205, a NCU modem 304 for modulating a digital signal from the communication controller 303 into an analog signal, demodulating an analog signal from the telephone line 205 into a digital signal and monitoring dialing and status directed from a telephone set line 206 to the telephone line 205, a floppy disc controller 307 responsive to commands from the communication CPU 301 to control the FDD 27, and an internal bus and line e through which the communication CPU 301 is interconnected with the bootstrap ROM 302, communication controller 303, memory controller 305, floppy disc controller 307 and timer 308. All the components of the communication control circuit as well as the FDD 27 are fed with DC voltage from a power supply 360.

The main console control circuit 25 and the communication control circuit 28 are interconnected together through the line 204. The host CPU 251 and the communication CPU 301 are both accessible to the communication memory 306 through the memory controller 305 and they communicate control signals to each other by way of a work area within the communication memory 306. Since the main console control circuit 25 and the communication control circuit 28 are operable by being fed from the separate power supplies, they can perform their individual functions irrespective of the fact that the power supply of their cooperative unit is turned on.

The FDD's 24 and 27 drive floppy discs in the form of a magnetic storage medium so as to record information on the floppy discs and read information from the floppy discs. The main console 20 has front openings in which the FDD's 24 serving as the temporary storages are received. Similarly, the communication unit 26 has a front opening for receiving the FDD 27 serving as the temporary storage.

The program required for performing functions of the word processor is recorded on one of the floppy discs set in one FDD 24 and documents prepared by the word processor are recorded on the other floppy disc set in the other FDD 24. The program required for controlling communications is recorded on the floppy disc set in the FDD 27 and transmission/reception documents and results of communications are temporarily recorded on this floppy disc.

Figure 3:
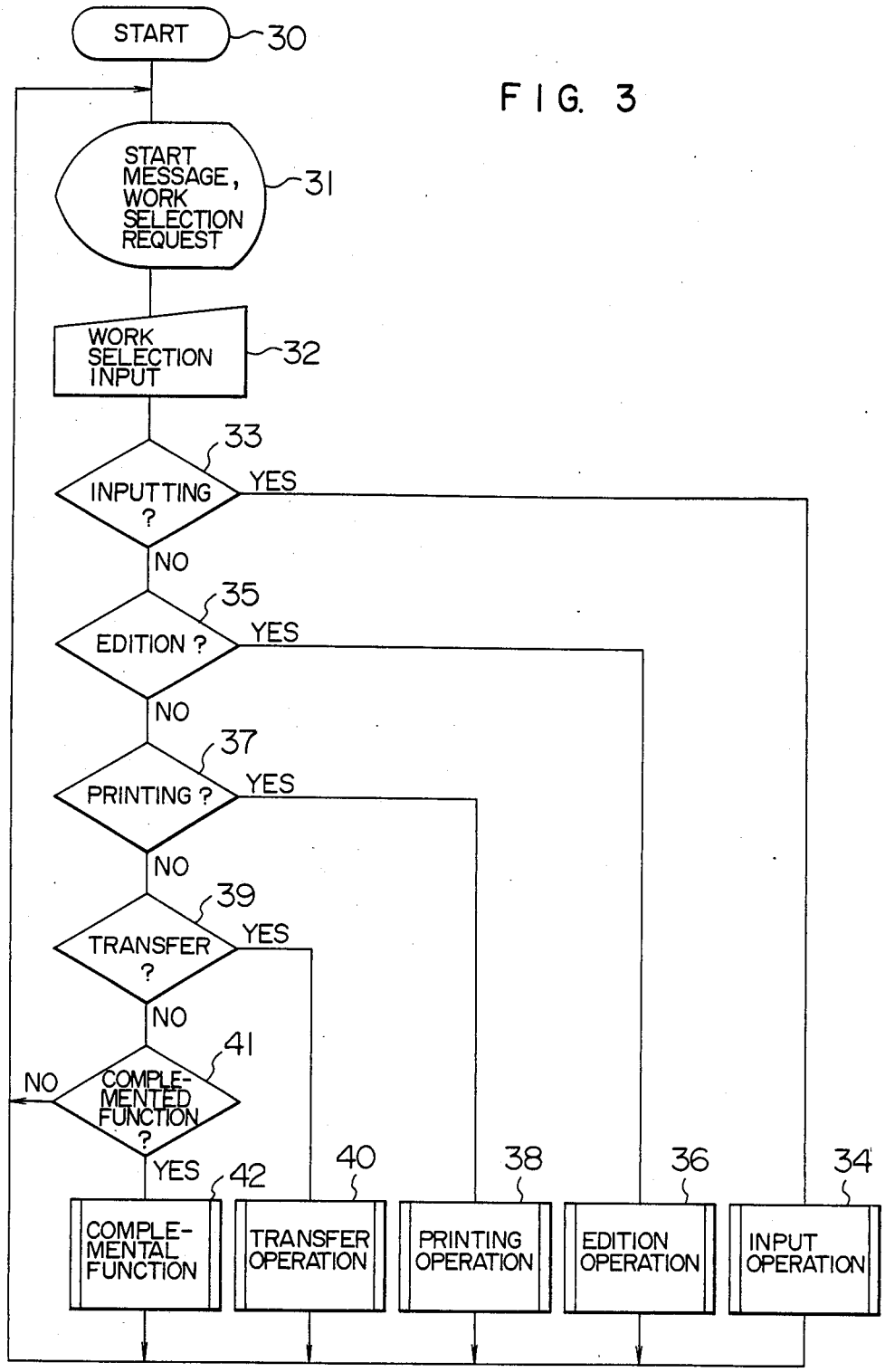
FIG. 3 is a flow chart schematically showing the operation of a word processor of the teletex system.
Figure 4:
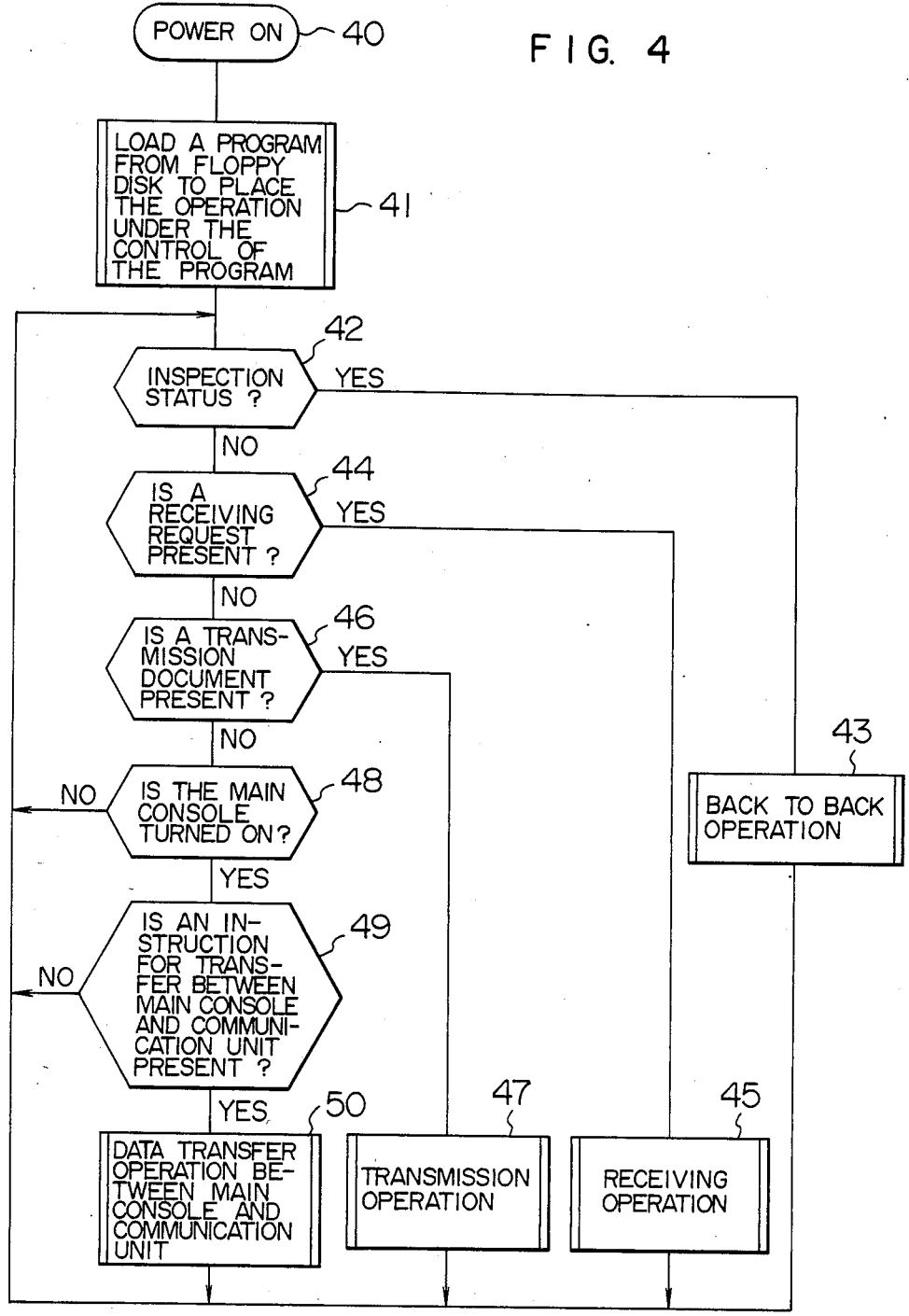
FIG. 4 is a flow chart schematically showing the operation of a communication unit of the teletex system.

The overall operation of the teletex system constructed as above will now be described. When the power supply 260 is turned on, the word processor first follows the program in the bootstrap ROM 252 to transfer to the memory 253 the program stored in the floppy disc set in one FDD 24 and having a flow as shown in FIG. 3 to perform functions of the word processor, and then begins to fulfil its functions in accordance with the program transferred to the memory 253. Similarly, the communication unit 26 first follows the program in the bootstrap ROM 302 to transfer to the memory 306 the program stored in the floppy disc set in the FDD 27 and having a flow as shown in FIG. 4 to perform functions of the communication unit, and then begins to fulfil its functions in accordance with the program transferred to the memory 306.

In the flow of FIG. 3, when an input operation is selected by manipulating a work selection input key, an input operation program is executed. By controlling the CRT driver 254 in accordance with the input operation program stored in the memory 253, a screen pattern corresponding to a document in process of the input operation is prepared and converted into a video signal which is supplied to the CRT monitor 23 to provide a display on the screen of the CRT monitor. The document is processed in accordance with data and function instructions which are inputted from the keyboard 21. (Steps 30 to 32).

In the input operation, inputting and edition are repeated until an instruction indicative of the end of data input is issued, and results of the repetitive operations are displayed on the CRT monitor 23. When the instruction indicative of the end of data input is inputted from the keyboard 21, the CPU 251 detects this instruction to execute an end operation and stands by to execute the succeeding operation as shown in the flow chart of FIG. 3. (Steps 33 and 34).

In an edition operation in the flow chart of FIG. 3, the display on the screen is changed by a function key on the keyboard 21. (Steps 35 and 36). In other operations, work instructions and work progression are displayed on the CRT monitor 23.

In a printing operation in the flow chart of FIG. 3, a function key on the keyboard 21 is manipulated, so that the document designated and recorded on the floppy disc set in the FDD 24 is converted into image data, a signal is applied to the printer 22 through the printer controller 256, and the document is printed on a paper sheet set on the printer 22. (Steps 37 and 38).

In a transfer operation in the flow of FIG. 3, if the communication unit 26 is powered on and is ready to respond, a function key on the keyboard 21 is manipulated, so that the document designated and recorded on the floppy disc set in the FDD 24 is set in the work area on the communication memory 306 through the interface converter 258 and memory controller 305 and then transferred to the communication CPU 301 of the communication unit. When receiving the data, the communication CPU 301 causes, through the floppy disc controller 307, the floppy disc set in the FDD 27 to temporarily store and record that data. If the communication has received a document and the document is recorded on the floppy disc set in the FDD 27, the keyboard 21 is manipulated to designate that document, causing the communication CPU 301 to set the designated document in the work area of the communication program memory and transfer the temporarily stored document to the host CPU 251 included in the main console control unit through the memory controller 305 and interface converter 258. (Steps 39 and 40).

In a complemental function operation in the flow of FIG. 3, a function of copying documents stored in the floppy discs in use into other fresh floppy discs and the like function are generally carried out. (Steps 41 and 42).

The operation of the communication unit will now be described with refference to the flow of FIG. 4. When the communication unit is brought into operation, the keyboard 21 is manipulated to set either an inspection status or a communication status in advance. (Steps 40 and 41).

By using the head of the program, it is decided whether the inspection status or the communication status is preset. (Step 42). If the decision indicates that the communication status is set, it is decided whether a receiving request from the telephone line 205 is received and with the receiving request being received, a receiving operation is performed. (Steps 44 and 45). In the receiving operation indicated by step 45, a received document is recorded on the floppy disc set in the FDD 27 through the NCU modem 304, communication controller 303 and floppy disc controller 307. In the absence of the receiving request, it is decided whether there is a document to be transmitted and with the transmission document being present, a transmission operation is carried out. (Steps 46 and 47). In the transmission operation indicated by step 47, a document recorded on the floppy disc set in the FDD 27 is transmitted through the communication controller 303, NCU modem 304 and telephone line 205. In the absence of the transmission document, it is decided whether the main console 20 is powered on and with the main console being not powered on, the procedure returns to the step for deciding whether the receiving request is received. (Steps 47, 42 and 44). With the main console being powered on, it is decided whether there is a transfer instruction from the main console and in the absence of the transfer instruction, the procedure returns to the step for deciding whether the inspection status is preset. (Steps 49 and 42). If the transfer instruction is present, the procedure proceeds to a data transfer operation in which data is transferred between the communication unit 26 and the main console 20. (Step 50). In the data transfer operation indicated by step 50, the communication unit 26 responds to instructions from the main console 20 so as to receive a transmission document and record the transmission document on the floppy disc set in the FDD 27, so as to transfer a received document recorded on that floppy disc to the main console and so as to transfer status information indicative of a status of the communication unit and communication results recorded on that floppy disc to the main console.

When the inspection status is decided, a back to back operation is performed between an addressor station and an addressee station comprised of the same type of teletex system as that of the addressor station in accordance with a communication agreement which is used to confirm the operation status of a channel including the addressor teletex system, addressee teletex system of the same type and communication circuit, independently of another communication protocol on data transmission and reception which regulates data communications between the addressor teletex system and other teletex systems of the same type or different types. (Steps 42 and 43). For details of the back to back operation, reference may be made to JP-A-No. 62-257561 published on Nov. 10, 1987.

Figure 5:
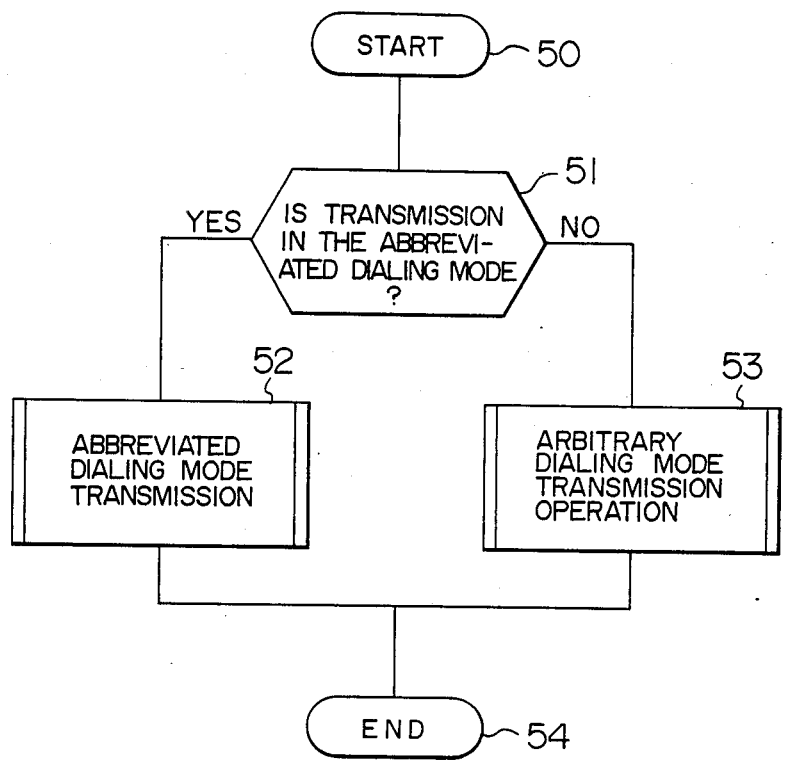
FIG. 5 is a schematic flow chart showing a transmission operation included in the flow chart of FIG. 4

The transmission operation will now be described in greater detail with reference to FIGS. 5, 6 and 7. As shown in FIG. 5, the transmission operation has two modes, one being an abbreviated dialing mode in which addressee dial numbers frequently used in daily services and so precedently registered are used and the other being an arbitrary dialing mode in which an addressee dialing number is inputted for communication with each desired addressee. (Steps 50 to 54).

Figure 6:
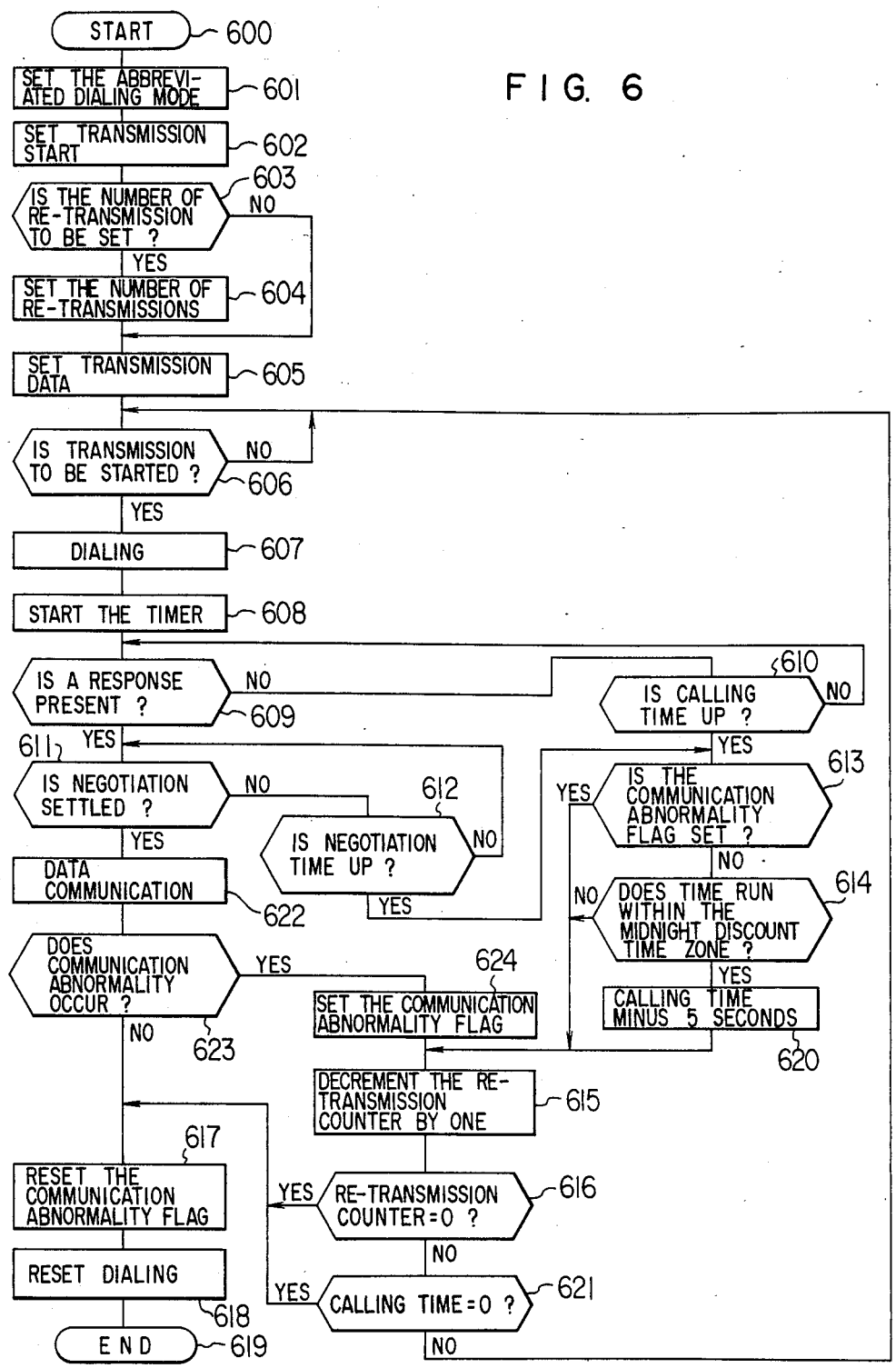
FIG. 6 is a flow chart showing in detail an abbreviated dialing operation included in the flow chart of FIG. 5.

Referring to FIG. 6, the transmission operation in the abbreviated dialing mode will first be described specifically. Firstly, addressee dialing information is selected from a precedently registered abbreviated dialing table, and the abbreviated dialing information, transmission start time, the number of re-transmissions during calling an addressee and transmission data (transmission document) are inputted by manipulating the keyboard 21. When the number of re-transmissions is not set, a default value of the system is instead set. (Steps 600 to 606). At the time that a transmission is to be started, an addressee is called by dialing through the NCU modem 304 and telephone line 205 and the timer is started. (Steps 607 and 608). The addressor then waits for a response from the addressee and on the condition that either no response is received from the addressee within a predetermined period of time or a response is received within the predetermined period of time, but no negotiation is settled within a predetermined period of time and that the timer 308 is not indicating, at the time of start of the transmission operation, a time (for example, 9:00 PM to 6:00 AM in Japan) to which midnight discount is applied, the addressee is decided to be busy because it is expected that the addressee system is transferred to the telephone set side by means of a communication unit/telephone set switching device, with the result that a re-transmission counter is decremented by 1 (one) and the circuit is temporarily disconnected until a retransmission is effected within a predetermined period of time. The re-transmission operation is repeated at predetermined intervals until the re-transmission counter indicates zero. (Steps 609 to 616). When the retransmission counter indicates zero, a communication abnormality flag and the dialing information are reset and the transmission operation ends. (Steps 617 to 619).

If, in the above procedure, the timer 308 is indicating, at the time of start of the transmission operation, a time (for example, 9:00 PM to 6:00 AM in Japan) to which midnight discount is applied, the calling time (response waiting time) for each of the succeeding transmission operations is sequentially reduced by 5 seconds because it is expected that a wrong telephone number is called. (Steps 609, 611, 612, 613, 614 and 620). When either the re-transmission counter indicates zero or the calling time is reduced to zero, the communication abnormality flag and dialing information are reset and the transmission operation ends. (Steps 615, 616, 621, 617, 618 and 619).

For example, when in the system the calling time (response waiting time) is set to be 40 seconds and the number of re-transmissions is set to be 12, the re-transmission can be effected eight times at intervals 40 seconds, 35 seconds, 30 seconds, 25 seconds, 20 seconds, 15 seconds, 10 seconds and 5 seconds and the remaining four re-transmissions of the twelve re-transmissions can automatically be invalidated.

On the condition that a response to the addressee dialing is present, it is decided whether negotiation on modem functions of determining a communication speed and a modem training signal is settled within the predetermined period of time. (Steps 609, 611 and 612). According to the protocol on teletex communications, during the negotiation, the addressor should await a response from the addressee for 30 to 40 seconds at the maximum and the addressee should repeat returning of responses six times at the maximum at intervals of 3 seconds. When the negotiation is settled within the above period of time, data communications are permitted to start pursuant to the protocol on teletex communications. (Steps 611 and 622). After completion of the data communications, a re-transmission flag, the communication abnormality flag and dialing information are reset and the transmission operation ends. (Steps 622, 623, 617, 618 and 619).

If communication abnormality occurs in the course of the data communications, the communication abnormality flag is set, and the re-transmission counter is decremented by one and the circuit is temporarily disconnected until a re-transmission is effected after a lapse of a predetermined period of time. Before the re-transmission counter indicates zero, the re-transmission operation is repeated at predetermined intervals until the data communications is normally completed. (Steps 623, 624, 615 and 616). If the data communications are not completed normally even when the re-transmission counter reaches zero, the communication abnormality flag and dialing information are reset and the transmission operation ends. (Steps 616, 617, 618 and 619).

Figure 7:
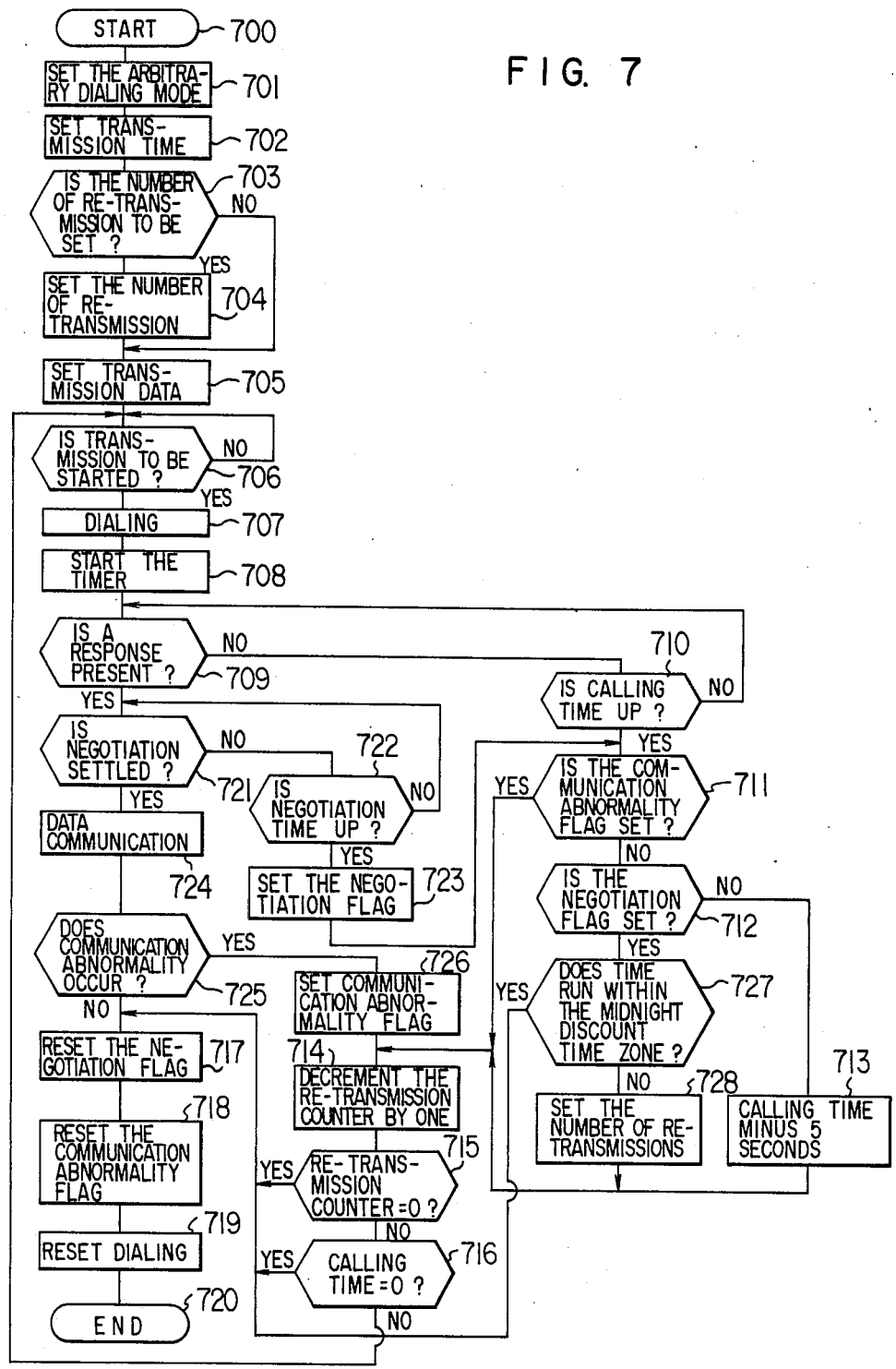
FIG. 7 is a flow chart showing in detail an arbitrary dialing operation included in the flow chart of FIG. 5.

Referring now to FIG. 7, the transmission operation in arbitrary mode will be described specifically. Firstly, addressee dialing information, transmission start time, the number of re-transmissions during calling an addressee and transmission data (transmission document) are inputted by manipulating the keyboard 21. When the number of re-transmissions is not set, the default value of the system is instead set. (Steps 700 to 706). At the time that a transmission is to be started, an addressee is called by dialing through the NCU modem 304 and telephone line 205 and the timer is started. (Steps 707 and 708).

The addressor then waits for a response from the addressee and on condition that no response is received from the addressee within the predetermined period of time, the calling time (response waiting time) for each of the succeeding transmission operations is sequentially reduced by 5 seconds because it is expected that a wrong telephone number is called. (Steps 709, 710, 711, 712 and 713). When either the re-transmission counter indicates zero or the calling time is reduced to zero, the negotiation flag, communication abnormality flag and dialing information are reset and the transmission operation ends. (Steps 714 to 720).

For example, when in the system the calling time (response waiting time) is set to be 40 seconds and the number of re-transmissions is set to be 12, the re-transmission can be effected eight times at intervals 40 seconds, 35 seconds, 30 seconds, 25 seconds, 20 seconds, 15 seconds, 10 seconds and 5 seconds and the remaining four re-transmissions of the twelve re-transmissions can automatically be invalidated.

On the condition that a response is received but no negotiation is settled within the predetermined period of time, whereby the negotiation flag is set because it is expected that a wrong telephone number is called, and that the timer 308 is not indicating, at the time of start of the transmission operation, a time (for example, 9:00 PM to 6:00 AM in Japan) to which midnight discount is applied, the number of re-transmissions is set to 2 and the re-transmission counter is decremented by one to temporarily disconnect the circuit. (Steps 721, 722, 723, 727, 728 and 714). Thus, within the predetermined period of time, only one re-transmission operation is effected, and the negotiation flag, communication abnormality flag and dialing information are reset and the transmission operation ends.

If, in the above procedure, the timer 308 is indicating, at the time of start of the transmission operation, a time (for example, 9:00 PM to 6:00 AM in Japan) to which midnight discount is applied, a wrong telephoning is decided with the result that the negotiation flag, communication abnormality flag and dialing information are reset and the transmission operation ends. (Steps 721, 722, 723, 727 and 717 to 720).

On the condition that a response to the addressee dialing is present, it is decided whether negotiation on modem functions of determining the communication speed and the modem training signal is settled within the predetermined period of time. (Steps 709, 721 and 722). As described previously, the agreement (protocol) on the teletex communications prescribes that during the negotiation, the addressor should await a response from the addressee for 30 to 40 seconds at the maximum and the addressee should repeat returning of responses six times at the maximum at intervals of 3 seconds. When the negotiation is settled within the above period of time, data communications are permitted to start pursuant to the agreement on teletex communication. (Steps 721 and 724). After completion of the data communications, the negotiation flag, communication abnormality flag and dialing information are reset and the transmission operation end. (Steps 724, 725 and 717 to 720).

If communication abnormality occurs in the course of the data communications, the communication abnormality flag is set, and the re-transmission counter is decremented by one and the circuit is temporarily disconnected until a re-transmission is effected within the predetermined period of time. Before the re-transmission counter indicates zero, the re-transmission operation is repeated at predetermined intervals until the data communications are normally completed. (Steps 725, 726, 714 and 715). If the data communications are not completed normally even when the re-transmission counter reaches zero, the communication abnormality flag and dialing information and reset and the transmission operation ends. (Steps 715 and 717 to 720).

In summary, according to the present invention, in the abbreviated dialing mode communications in which addressee dial numbers frequently used in daily services and so precedently registered are used, on the condition that either no response is received from the addressee within the predetermined period of time or a response is received but no negotiation is settled within the predetermined period of time and that the timer is not indicating, at the time of start of the transmission operation, a time (for example, 9:00 PM to 6:00 AM in Japan) to which midnight discount is applied, a predetermined number of communication operations are performed because it is expected that the addressee system is transferred to the telephone set side by means of the communication unit/telephone set switching device and the addressee will be urged to switch the circuit to the communication unit side.

If, in the above procedure, the timer is indicating a time (for example, 9:00 PM to 6:00 AM in Japan) to which midnight discount is applied, the calling time (response waiting time) for each of the succeeding transmission operations is sequentially reduced because it is expected that a wrong telephone number is called, thereby minimizing trouble given to the addressee.

Preferably, by selecting the calling time (response waiting time) in the system which is so set as to be necessarily minimized, the re-transmission can automatically be invalidated even when the number of re-transmissions is set to be large, thus also contributing to minimization of trouble given to the addressee.

Next, in the arbitrary dialing mode communications in which an addressee dialing number is inputted for communication with each desired addressee, on the condition that no response is received from the addressee within the predetermined period of time, the calling time (response waiting time) for each of the succeeding transmission operations is sequentially reduced irrespective of whether the timer is indicating a time (for example, 9:00 PM to 6:00 AM in Japan) to which midnight discount is applied because it is expected that a wrong telephone number is called, thereby minimizing trouble given to the addressee.

Preferably, by selecting the calling time (response waiting time) in the system which is so set as to be necessarily minimized, the re-transmission can automatically be invalidated even when the number of re-transmissions is set to be large, also contributing to minimization of trouble given to the addressee.

In the arbitrary dialing mode, on the condition that a response is received but no negotiation is settled within the predetermined period of time, suggesting a wrong telephoning and that the time is not indicating a time (for example, 9:00 PM to 6:00 AM in Japan) to which midnight discount is applied, the communication operations, inclusive of the initial communication operation, are permitted to be performed twice because it is expected that the addressee system is transferred to the telephone set side by means of the communication unit/telephone switching device and the addressee will be urged to switch the circuit to the communication unit side. Thus, unless the negotiation is settled within the predetermined period of time, the transmission operation ends to thereby minimize trouble given to the addressee.

On the condition that a response is present but no negotiation is settled within the predetermined period of time and that the timer is indicating a time (for example, 9:00 PM to 6:00 AM in Japan) to which midnight discount is applied, a wrong telephoning is decided and only the initial communication operation is performed but the succeeding communication operations are prevented, thereby minimizing trouble given to the addressee.

As described above, according to the invention, when a wrong addressee telephone number is inadvertently called in either of the abbreviated dialing mode in which addressee dial numbers frequently used in daily services and so precedently registered are used and the arbitrary dialing mode in which an addressee dialing number is inputted for communication with each desired addressee, restrictions are placed on the re-transmission operation due to the wrong telephoning in accordance with time which runs at the time of start of the communication operation to thereby minimize trouble given to the addressee, ensuring that an improved teletex system can be provided.

While the foregoing embodiment has been described as applied to the teletex system, the present invention may obviously be applicable to communication systems having an automatic transmission/reception function to perform data communications through the telephone lines.

I claim:

1. A method for re-transmission in a teletex system comprised of a word processor for preparing, printing and registering documents, and a communication unit connected to a public communication line and to said word processor and having an automatic transmission/reception function to transmit and receive documents, said method comprising:

a first decision step for deciding a wrong telephoning and a communication failure transmission operation in the abbreviated dialing mode communications on the condition that either no response is received within a predetermined period of time or a response is received but no negotiation is settled within a predetermined period of time;

a first reduction step responsive to said first decision step for sequentially reducing the calling time or response waiting time for each of re-transmission operations following said communication failure transmission operation when time runs within a specified time zone;

a second decision step for deciding a wrong telephoning and a communication failure transmission operation, in the arbitrary dialing mode communications in which an addressee dialing number is inputted for communication with each desired addressee, on the condition that no response is received within a predetermined period of time;

a second reduction step responsive to said second decision step for sequentially reducing the calling time or response waiting time for each of re-transmission operations following said communication failure transmission operation irrespective of whether time runs within said specified time zone;

a third decision step for deciding a wrong telephoning and a communication failure transmission operation in the arbitrary dialing mode communications on the condition that a response is received within the predetermined period of time but no negotiation is settled within a predetermined period of time; and an inhibition step responsive to said third decision step for inhibiting communication operations following said communication failure transmission operation when time runs within said specified time zone.

2. A re-transmission method according to claim 1 wherein in said first decision step, the number of re-transmission operations is decremented by one every re-transmission operation until it reaches zero.

3. A re-transmission method according to claim 2 wherein in said first reduction step, the transmission operation ends when either the number of re-transmission operations is decremented to zero or the calling time is reduced to zero.

4. A re-transmission method according to claim 1 wherein in said second decision step, the number of re-transmission operations is decremented by one every re-transmission operation until it reaches zero.

5. A re-transmission method according to claim 4 wherein in said second reduction step, the transmission operation ends when either the number of re-transmission operations is decremented to zero or the calling time is reduced to zero.

6. A re-transmission method according to claim 1 further comprising a step responsive to said third decision step for permitting the communication operations, inclusive of the initial transmission operation, to be performed twice when time runs outside said specified time zone.

7. A re-transmission method according to claim 1 wherein said specified time zone is a time zone within which midnight discount is applied to the use of said public communication line.

8. A re-transmission method according to claim 1 further comprising a step for selectively executing said first, second and third decision steps in accordance with a selection operation for said abbreviated dialing mode and an arbitrary dialing mode, and a step for executing said first or second reduction step in accordance with whether time runs, at the time of execution of selected one of said first and second decision steps, within said specified time zone.

9. A re-transmission method according to claim 1 wherein the calling time or response waiting time is so set as to be necessarily minimized.

10. An apparatus for re-transmission in a teletex system comprised of a word processor for preparing, printing and registering documents, and a communication unit connected to public communication line such as a telephone line and to said word processor and having an automatic transmission/reception function to transmit and receive documents, said apparatus comprising:

first decision means for deciding a wrong telephoning and a communication failure transmission operation in the abbreviated dialing mode communications by detecting that either no response is received within a predetermined period of time or a response is received but no negotiation is settled within a predetermined period of time;

first call reduction means responsive to said first decision means for sequentially reducing the calling time or response waiting time for each of re-transmission operations following said communication failure transmission operation when time runs within a specified time zone;

second decision means for deciding a wrong telephoning and a communication failure transmission operation, in the arbitrary dialing mode communications in which an addressee dialing number is inputted for communication with each desired addressee, by detecting that no response is received within a predetermined period of time;

second call reduction means responsive to said second decision means for sequentially reducing the calling time or response waiting time for each of re-transmission operations following said communication failure transmission operation irrespective of whether time runs within said specified time zone;

third decision means for deciding a wrong telephoning and a communication failure transmission operation in the arbitrary dialing mode communications by detecting that a response is received within the predetermined period of time but no negotiation is settled within a predetermined period of time; and inhibition means responsive to said third decision means for inhibiting communication operations following said communication failure transmission operation when time runs within said specified time zone.

11. A re-transmission apparatus according to claim 10 further comprising means responsive to said third decision means for permitting the communication operations, inclusive of the initial transmission operation, to be performed twice when time runs outside said specified time zone.

12. A re-transmission apparatus according to claim 10 further comprising means for selectively executing said first, second and third decision means in accordance with a selection operation for said abbreviated dialing mode and arbitrary dialing mode, and clock means for executing said first or second call reduction means in accordance with whether time runs, at the time of execution of selected one of said first and second decision means, when time runs within said specified time zone.

13. A re-transmission apparatus according to claim 10 wherein said first and second call reduction means store a program through which the calling time is sequentially reduced each time one of a series of re-transmission operations is effected.

* * * * *